US009426002B2

(12) United States Patent
Nammi et al.

(10) Patent No.: US 9,426,002 B2
(45) Date of Patent: *Aug. 23, 2016

(54) METHODS OF RECEIVING MIMO TRANSMISSIONS AND RELATED DEVICES

(75) Inventors: Sairamesh Nammi, Kista (SE); Cagatay Konuskan, Linköping (SE); Namir Lidian, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/422,998

(22) PCT Filed: Aug. 24, 2012

(86) PCT No.: PCT/SE2012/050902
§ 371 (c)(1),
(2), (4) Date: Feb. 20, 2015

(87) PCT Pub. No.: WO2014/031050
PCT Pub. Date: Feb. 27, 2014

(65) Prior Publication Data
US 2015/0222407 A1 Aug. 6, 2015

(51) Int. Cl.
*H04L 25/03* (2006.01)
*H04B 7/04* (2006.01)
*H04L 5/00* (2006.01)
*H04B 7/06* (2006.01)
*H04L 1/18* (2006.01)
*H04L 1/20* (2006.01)

(52) U.S. Cl.
CPC ........ *H04L 25/03929* (2013.01); *H04B 7/0413* (2013.01); *H04B 7/0417* (2013.01); *H04B 7/0697* (2013.01); *H04L 1/1829* (2013.01); *H04L 1/208* (2013.01); *H04L 5/0055* (2013.01)

(58) Field of Classification Search
None
See application file for complete search history.

(56) References Cited

U.S. PATENT DOCUMENTS

2007/0147329 A1 6/2007 Soriaga et al.
2008/0225966 A1* 9/2008 Tseng ............... H04W 72/1289
375/260

(Continued)

FOREIGN PATENT DOCUMENTS

EP 1971096 A2 9/2008
WO WO 2009/137646 11/2009

OTHER PUBLICATIONS

PCT Written Opinion of the International Searching Authority for International application No. PCT/SE2012/050902, Aug. 22, 2013.

(Continued)

*Primary Examiner* — Ashley Shivers
(74) *Attorney, Agent, or Firm* — Patent Portfolio Builders, PLLC

(57) ABSTRACT

A method of operating a terminal in a radio access network may include receiving a transmission of first and second data blocks over respective first and second multiple-input-multiple-output (MIMO) layers during a transmission time interval (TTI). Respective first and second demodulated codewords may be generated corresponding to the transmission of the first and second data blocks, and the first and second demodulated codewords may be decoded. Responsive to failure decoding the first demodulated codeword and success decoding the second demodulated codeword, a negative acknowledgement may be transmitted indicating failure receiving the first and second data blocks. Related terminals are also discussed.

18 Claims, 8 Drawing Sheets

(56) References Cited

U.S. PATENT DOCUMENTS

2009/0279460 A1* 11/2009 Sarkar .................. H04L 1/16
 370/280
2012/0057451 A1 3/2012 Kim et al.

OTHER PUBLICATIONS

International Search Report for International application No. PCT/SE2012/050902, Aug. 22, 2013.

"Capacity of Multi-antenna Gaussian Channels" by Emre Telatar, 2001.
"Utra-Utran Long Term Evolution (LTE) and 3GPP System Architecture Evolution (SAE)" Long Term Evolution of the 3GPP radio technology, 2004.
"From Theory to Practice: An Overview of MIMO Space-Time Coded Wireless Systems" by Gesbert et al., 2003.
3GPP TS 25.214 V11.1.0; 3rd Generation Partnership Project; Technical Specification Group Radio Access Network; Physical layer procedures (FDD) (Release 11), 2012.

* cited by examiner

| Input | | Output | |
|---|---|---|---|
| 1st | 2st | 1st | 2st |
| ACK | ACK | ACK | ACK |
| ACK | NACK | NACK | NACK |
| NACK | ACK | NACK | NACK |
| NACK | NACK | NACK | NACK |

METHODS OF RECEIVING MIMO TRANSMISSIONS AND RELATED DEVICES

This nonprovisional application is a U.S. National Stage Filing under 35 U.S.C. §371 of International Patent Application Ser. No. PCT/SE2012/050902, filed Aug. 24, 2012 and entitled "METHODS OF RECEIVING MIMO TRANSMISSIONS AND RELATED DEVICES."

TECHNICAL FIELD

The present disclosure is directed to wireless communications and, more particularly, to multiple-input-multiple-output (MIMO) wireless communications and related network nodes and wireless terminals.

BACKGROUND

In a typical cellular radio system, wireless terminals (also referred to as user equipment unit nodes, UEs, and/or mobile stations) communicate via a radio access network (RAN) with one or more core networks. The RAN covers a geographical area which is divided into cell areas, with each cell area being served by a radio base station (also referred to as a RAN node, a "NodeB", and/or enhanced NodeB "eNodeB"). A cell area is a geographical area where radio coverage is provided by the base station equipment at a base station site. The base stations communicate through radio communication channels with UEs within range of the base stations.

Multi-antenna techniques can significantly increase capacity, data rates, and/or reliability of a wireless communication system as discussed, for example, by Telatar in "Capacity Of Multi-Antenna Gaussian Channels" (European Transactions On Telecommunications, Vol. 10, pp. 585-595, Nov. 1999). Performance may be improved if both the transmitter and the receiver for a base station sector are equipped with multiple antennas (e.g., an sector antenna array) to provide a multiple-input multiple-output (MIMO) communication channel(s) for the base station sector. Such systems and/or related techniques are commonly referred to as MIMO. The LTE standard is currently evolving with enhanced MIMO support and MIMO antenna deployments. A spatial multiplexing mode is provided for relatively high data rates in more favorable channel conditions, and a transmit diversity mode is provided for relatively high reliability (at lower data rates) in less favorable channel conditions.

In a downlink from a base station transmitting from a sector antenna array over a MIMO channel to a wireless terminal in the sector, for example, spatial multiplexing (or SM) may allow the simultaneous transmission of multiple symbol streams over the same frequency from the base station sector antenna array for the sector. Stated in other words, multiple symbol streams may be transmitted from the base station sector antenna array for the sector to the wireless terminal over the same downlink transmission time interval (TTI) and/or time/frequency resource element (TFRE) to provide an increased data rate. In a downlink from the same base station sector transmitting from the same sector antenna array to the same wireless terminal, transmit diversity (e.g., using space-time codes) may allow the simultaneous transmission of the same symbol stream over the same frequency from different antennas of the base station sector antenna array. Stated in other words, the same symbol stream may be transmitted from different antennas of the base station sector antenna array to the wireless terminal over the same time/frequency resource element (TFRE) to provide increased reliability of reception at the wireless terminal due to transmit diversity gain.

In a two layer MIMO transmission (2Tx) scheme, up to two layers/streams of information/data may be transmitted in parallel using a same TTI/TFRE. Four layer MIMO transmission (4Tx) schemes are proposed for High-Speed-Downlink-Packet-Access (HSDPA) within Third Generation Partnership Project (3GPP) standardization as disclosed, for example, in 3GPP RP-111393 and 3GPP R1-111763, the disclosures of both of which are hereby incorporated herein in their entireties by reference. Accordingly, up to 4 layers of information/data may be transmitted in parallel using a same TTI/TFRE when using 4-branch MIMO transmission.

Hybrid automatic repeat request (HARQ) may be used in wireless systems to overcome transmission errors that are not corrected using a forward error correcting code (also referred to as a channel code). In a typical implementation of a HARQ process, a cyclic redundancy check (CRC) code is attached to each data packet (also referred to as a transport data block or a data block) to be transmitted by a transmitter (e.g., a base station) for error detection. At the receiver (e.g., a wireless terminal), the contents of the each received packet (transport data block) may be validated using the attached CRC. If the received packet fails the CRC validation, the receiver sends a non-acknowledgement (NAK) signal back to the transmitter to request retransmission. A packet that fails CRC validation may be retransmitted until either the packet is decoded successfully or until a maximum number of retransmissions (e.g., 4 to 6 retransmissions) is reached. Otherwise, if the received packet is successfully validated (either after an initial transmission or a retransmission) using the CRC validation, an acknowledgement (ACK) signal is sent back to the transmitter to acknowledge correct decoding of data packet. At the receiver, a received retransmitted packet and the received initially transmitted packet (that failed CRC validation) may be combined to improve the system throughput. Depending on the way the packets are combined, HARQ systems may be classified into two categories, namely, Chase combining (CC) or Incremental Redundancy (IR).

Multiple antennas employed at the transmitter and receiver may significantly increase system capacity as discussed for example, by: (1) I. E. Telatar in "Capacity Of Multi-Antenna Gaussian Channels," *Eur. Trans. Telecommun.*, vol. 10, pp. 585-595, November 1999; and (2) David Gesbert, et al., in "From Theory To Practice: An Overview Of MIMO Space-Time Coded Wireless Systems," IEEE Journal of Selected Areas in Commun., vol. 21, pp. 281302, April 2003. The disclosures of both of the above referenced publications are hereby incorporated herein in their entireties by reference.

By transmitting independent symbol streams in a same frequency bandwidth using spatial multiplexing (SM) as discussed above, a linear increase in data rate may be achieved with the increased number of antennas when operating at a relatively high signal to noise ratio. In a spatial multiplexing system, each transport data block (also referred to as a packet) may be mapped to a respective MIMO layer. For example, spatial multiplexing may be recommended in LTE/LTE-A with 2 antennas and for HSDPA with 2 antennas in DL and for UL, as discussed for example, by: (1) 3GPP, "Technical Specification Group Radio Access Network; Physical Layer Procedures (FDD) (Tech. Spec. 25.214 V7.7.0)," November 2007, available online at http://www.3gpp.org/ftp/Specs/html-info/25214.htm); and (2) 3rd Generation Partnership Project, "UTRA-UTRAN Long Term Evolution (LTE) And 3GPP System Architecture Evolution (SAE)," available at http://www.3gpp.org/Highlights/LTE/LTE.htm. The disclosures of both of the above referenced publications are hereby incorporated herein in their entireties by reference.

For a spatial multiplexing system with multiple codewords, there may be instances when only the wireless terminal reports ACK for a first transport data block and a NAK for a second transport data block transmitted/received during a same TTI/TFRE. FIG. 6 shows the success probabilities in a 2×2 MIMO for a downlink channel for various wireless terminal speeds. As shown in FIG. 6, as the wireless terminal speed increases, the probability that only one transport data block passes and the other transport data block of the same TTI/TFRE fails increases. This increased probability of failure may be due to outdated CQI (channel quality information). When one transport data block passes and the other transport data block fails, the transmitter may retransmit the failed data block based on the ACK/NAK indications. Because the downlink channel conditions may not vary at a fast rate over two to three consecutive transmission intervals, however, a transmission quality of the transport data block that fails CRC validation in the previous transmission may not improve with retransmission. Accordingly, a relatively high number of retransmissions may be required to achieve successful decoding and CRC validation of a transmitted/retransmitted data block. Unfortunately, the relatively high number of retransmissions may introduce delay in transferring data blocks to higher layers. In addition, there may be an increased probability of a relatively high residual block error rate.

SUMMARY

It may therefore be an object to address at least some of the above mentioned disadvantages and/or to improve performance in a wireless communication system.

According to some embodiments, a method of operating a terminal in a radio access network may include receiving a transmission of first and second data blocks over respective first and second multiple-input-multiple-output (MIMO) layers during a transmission time interval (TTI). Respective first and second demodulated codewords may be generated corresponding to the transmission of the first and second data blocks, and the first and second demodulated codewords may be decoded. Responsive to failure decoding the first demodulated codeword and success decoding the second demodulated codeword, a negative acknowledgement may be transmitted indicating failure receiving the first and second data blocks.

Transmitting the negative acknowledgment, for example, may include transmitting a first negative acknowledgment corresponding to the first codeword indicating failure receiving the first data block and transmitting a second negative acknowledgment corresponding to the second codeword indicating failure receiving the second data block. Even though one of the codewords passed decoding, negative acknowledgments may be reported for both codewords to trigger retransmission of both data blocks.

The transmission time interval may be a first transmission time interval used for an initial transmission of the first and second data blocks, and after transmitting the negative acknowledgment, a retransmission of the first and second data blocks may be received over the respective first and second MIMO layers during a second transmission time interval. Interference of the retransmission may be reduced responsive to the second demodulated codeword, and responsive to reducing the interference of the retransmission, a third demodulated codeword may be generated corresponding to the retransmission of the first data block. The first demodulated codeword may thus be generated responsive to the initial transmission of the first data block, the third demodulated codeword may be generated responsive to the retransmission of the first data block, and the second demodulated codeword may be generated responsive to the initial transmission of the second data block. The third demodulated codeword may then be decoded. More particularly, interference of the retransmission may be reduced by generating an encoded version of the second data block based on the corresponding second demodulated codeword (that was successfully decoded during the initial transmission), and using the encoded version of the second data block to reduce a component of the second data block in the retransmission. A likelihood of successfully decoding the third demodulated codeword (corresponding to the retransmission of the first data block) may thus be increased during the retransmission.

Decoding the third demodulated codeword may include decoding the third demodulated codeword responsive to the first demodulated codeword (generated responsive to the initial transmission of the first data block) and responsive to the third demodulated codeword (generated responsive to the retransmission of the first data block). The first demodulated codeword, for example, may be saved in a soft buffer and combined with the third demodulated codeword when demodulating the third demodulated codeword during the retransmission. A likelihood of successfully decoding the third demodulated codeword (corresponding to the retransmission of the first data block) may thus be increased.

Responsive to success decoding the third demodulated codeword (corresponding to the retransmission of the first data block), a positive acknowledgment may be transmitted to the base station indicating success receiving the first and second data blocks. Decoding the second demodulated codeword (corresponding to the second data block) during the initial transmission may include generating a second received data block corresponding to the second data block, and decoding the third demodulated codeword (corresponding to the first data block) during the retransmission may include generating a first received data block corresponding to the first data block. In addition, the first and second received data blocks may be combined into a received data stream.

Responsive to failure decoding the third demodulated codeword (corresponding to the retransmission of the first data block), a second negative acknowledgement may be transmitted to the base station indicating failure receiving the first and second data blocks.

After transmitting the second negative acknowledgment, a second retransmission of the first and second data blocks may be received over the respective first and second MIMO layers during a third transmission time interval, and interference of the second retransmission of the first and second data blocks may be reduced responsive to the second demodulated codeword (corresponding to the second data block that was successfully decoded during the initial transmission). Responsive to reducing interference of the second retransmission, a fourth demodulated codeword may be generated corresponding to the second retransmission of the first data block, and the fourth demodulated codeword may be decoded. Decoding the fourth demodulated codeword may include decoding the fourth demodulated codeword responsive to the fourth demodulated codeword (corresponding to the second retransmission of the first data block) and responsive to at least one of the first demodulated codeword (corresponding to the initial transmission of the first data block) and/or the third demodulated codeword (corresponding to the first retransmission of the first data block).

Decoding the second demodulated codeword during the initial transmission may include generating a second received data block corresponding to the second data block, and decoding the fourth demodulated codeword during the second retransmission may include generating a first received data block corresponding to the first data block. Responsive to success decoding the fourth demodulated codeword (corresponding to the second retransmission of the first data block), a positive acknowledgment may be transmitted to the base station indicating success receiving the first and second data blocks, and the first and second received data blocks may be combined into a received data stream.

According to some other embodiments, a terminal operating in a radio access network may include a transceiver configured to transmit and/or receive communications over a channel, and a processor coupled to the transceiver. The processor may be configured to receive a transmission of first and second data blocks over respective first and second multiple-input-multiple-output layers through the transceiver during a transmission time interval. The processor may be further configured to generate respective first and second demodulated codewords corresponding to the transmission of the first and second data blocks, and to decode the first and second demodulated codewords. The processor may be further configured to transmit a negative acknowledgement through the transceiver indicating failure receiving the first and second data blocks responsive to failure decoding the first demodulated codeword and success decoding the second demodulated codeword.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
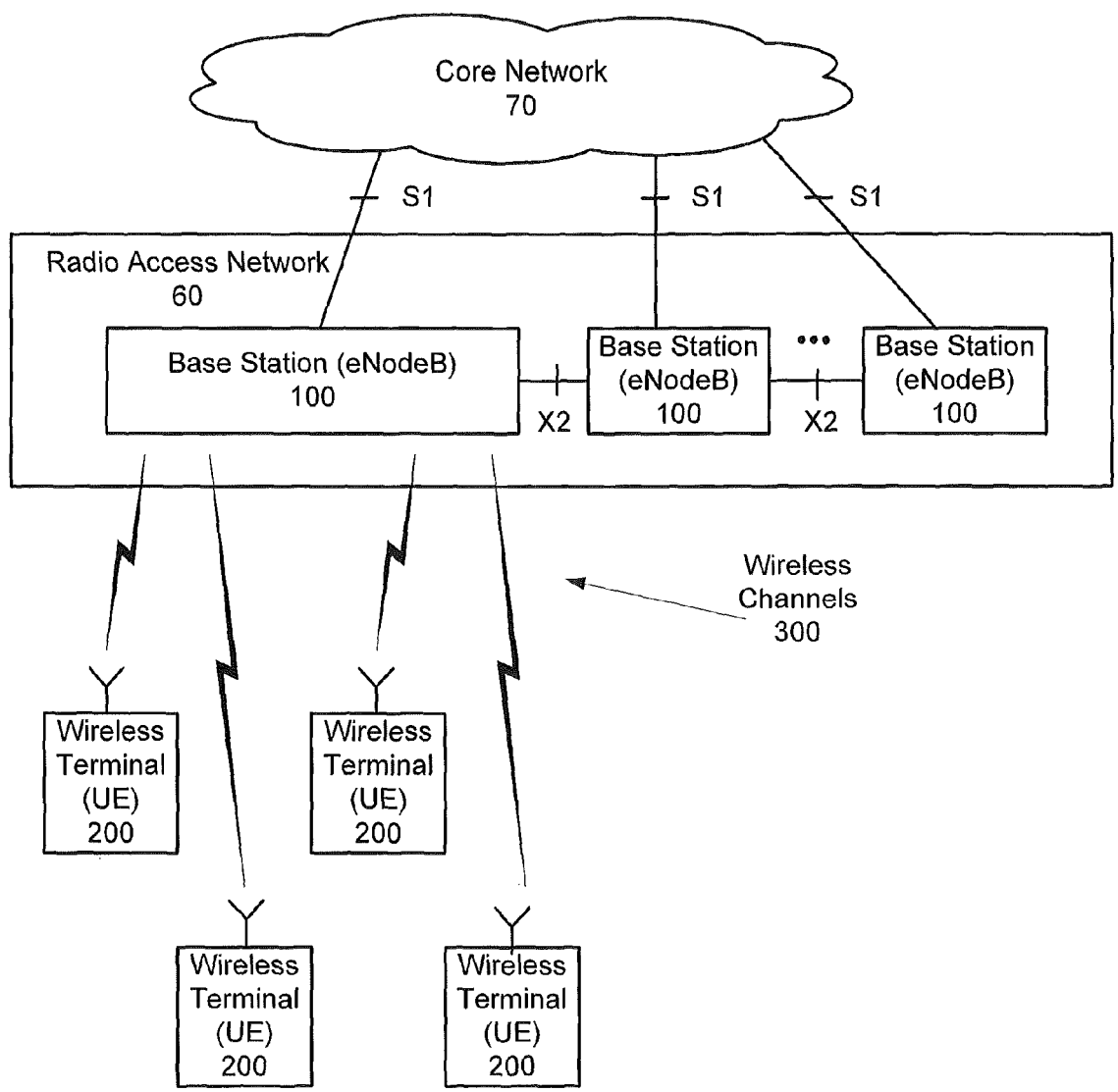
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with wireless terminals (also referred to as UEs). It will be understood, however, that the present invention is not limited to such embodiments and may be embodied generally in any type of communication network. As used herein, a wireless terminal (also referred to as a UE) can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controller is typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP (3$^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of the present invention disclosed herein.

Also note that terminology such as base station (also referred to as eNodeB or Evolved Node B) and wireless terminal (also referred to as UE or User Equipment) should be considering non-limiting and does not imply a certain hierarchical relation between the two. In general a base station (e.g., an "eNodeB") and a wireless terminal (e.g., a "UE") may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example RAN 60 is shown that may be a Long Term Evolution (LTE) RAN. Radio base stations (e.g., eNodeBs) 100 may be connected directly to one or more core networks 70, and/or radio base stations 100 may be coupled to core networks 70 through one or more radio network controllers (RNC). In some embodiments, functionality of a radio network controller(s) may be performed by radio base stations 100. Radio base stations 100 communicate over wireless channels 300 with wireless terminals (also referred to as user equipment nodes or UEs) 200 that are within their respective communication service cells (also referred to as coverage areas). The radio base stations 100 can communicate with one another through an X2 interface and with the core network(s) 70 through S1 interfaces, as is well known to one who is skilled in the art.

Figure 2:
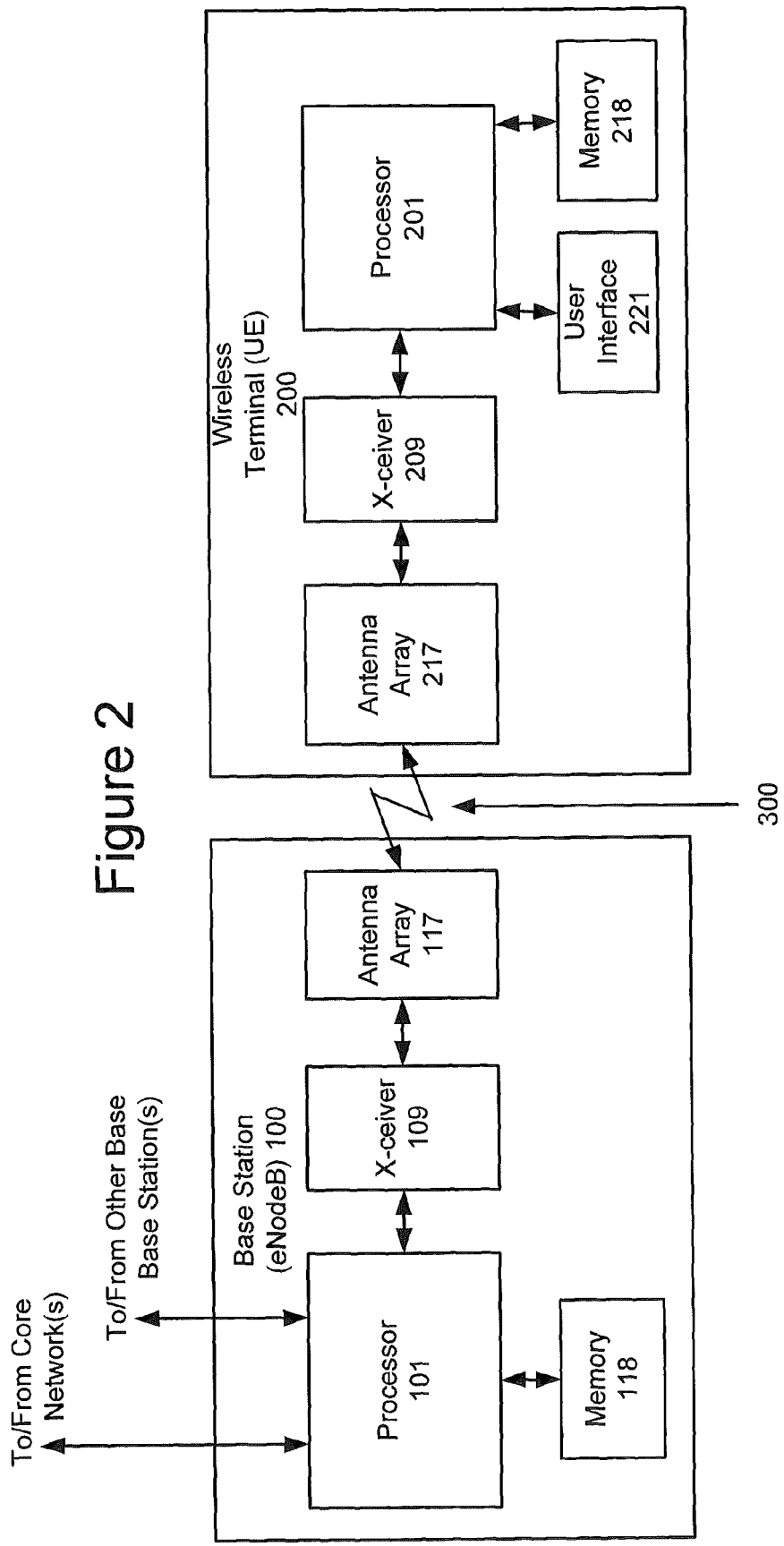
FIG. 2 is a block diagram illustrating a base station and a wireless terminal according to some embodiments of FIG. 1.

FIG. 2 is a block diagram of a base station 100 and a wireless terminal 200 of FIG. 1 in communication over wireless channel 300 according to some embodiments of the present invention. As shown, base station 100 may include transceiver 109 coupled between processor 101 and antenna array 117 (including multiple antennas), and memory 118 coupled to processor 101. Moreover, wireless terminal 200 may include transceiver 209 coupled between antenna array 217 and processor 201, and user interface 221 and memory 218 may be coupled to processor 201. Accordingly, base station processor 101 may transmit communications through transceiver 109 and antenna array 117 for reception at wireless terminal processor 201 through antenna array 217 and transceiver 209. In the other direction, wireless terminal processor 201 may transmit communications through transceiver 209 and antenna array 217 for reception at base station processor 101 through antenna array 117 and transceiver 109. To support up to 2-branch MIMO (allowing parallel transmission of 2 layers/streams of data using a same TTI/TFRE), each of antenna arrays 117 and 217 may include two (or more) antenna elements. Wireless terminal 200 of FIG. 2, for example, may be a cellular radiotelephone, a smart phone, a laptop/netbook/tablet/handheld computer, or any other device providing wireless communications. User interface 211, for example, may include a visual display such as an liquid crystal display, a touch sensitive visual display, a keypad, a speaker, a microphone, etc.

For MIMO downlink transmissions from RAN 60 to wireless terminal 200, a codebook of precoding vectors (known at both RAN 60 and wireless terminal 200) is used to precode (e.g., to apply precoding weights to) the different data layers (data streams) that are transmitted in parallel from a sector antenna array(s) to the wireless terminal 200 during a same MIMO layer (also referred to as a TFRE), and to decode the data layers (data streams) received in parallel during the same MIMO TTI at wireless terminal 200. The same codebook of precoding vectors may be stored in wireless terminal memory 218 and in base station memory 118. Moreover, wireless terminal 200 may estimate characteristics of each downlink channel to generate channel quality information (CQI), and CQI feedback from wireless terminal 200 may be transmitted to base station 100. This CQI feedback may then be used by the base station processor 101 to select: transmission rank (i.e., a number of data layers/streams to be transmitted during a subsequent TTI/TFRE); transport data block length(s); channel code rate(s) to be used to channel encode different transport data blocks; modulation order(s) defining a number of bits mapped to a modulated symbol; symbol to layer mapping schemes; and/or precoding vectors for respective downlink transmissions to the wireless terminal 200.

By way of example, base station antenna array 117 may include two antennas and wireless terminal antenna array 217 may include two antennas so that wireless terminal 200 may receive up to two downlink data layers (data streams) from base station antenna array 117 during MIMO communications. In this example, the precoding codebook may include rank 1 precoding vectors (used when transmitting one downlink data stream from a base station sector antenna array 117 to wireless terminal 200), and rank 2 precoding vectors (used when transmitting two downlink data streams from a base station sector antenna array 117 to wireless terminal 200). Precoding vectors may also be referred to, for example, as precoding codebook entries, precoding codewords, and/or precoding matrices.

Wireless terminal 200 may transmit CQI/PCI information (over uplink control channel HS-DPCCH) including a rank indicator RI (requesting/recommending a MIMO transmission rank), a precoding index PCI (requesting/recommending a precoding vector), and a modulation/coding scheme (MCS) for subsequent downlink transmissions from base station 100 to wireless terminal 200. Base station processor 101 may select the requested/recommended MIMO rank/vector and/or MCS and/or a different MIMO rank/vector and/or MCS, and base station 100 may indentify the selected MIMO rank/vector and/or MCS in downlink signaling transmitted to wireless terminal 200. Base station 100 may then transmit one or more transport data blocks using respective MIMO layers/streams over the downlink channel in a subsequent TTI/TFRE in accordance with the selected MIMO rank/vector and/or MCS as downlink traffic.

Figure 3:
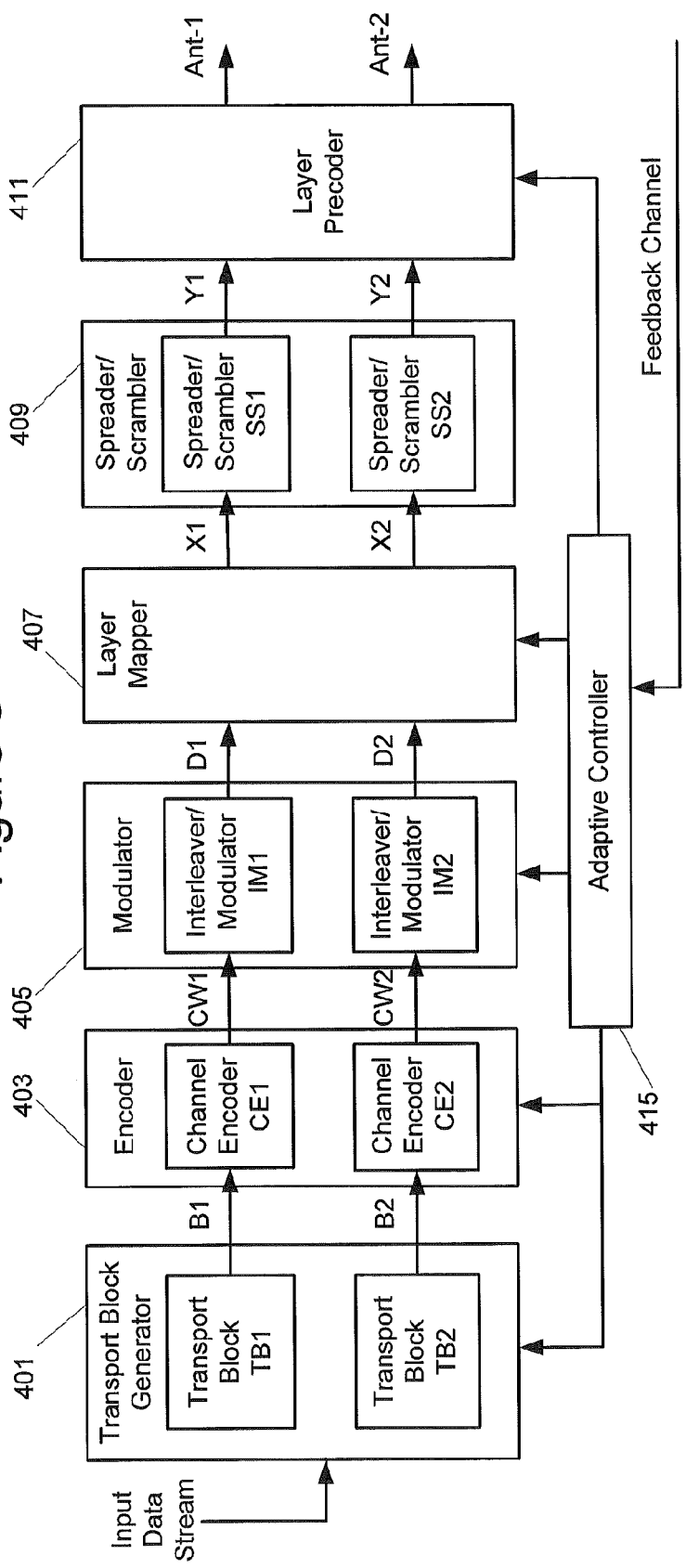
FIG. 3 is a block diagram illustrating elements/functionalities of base station processors according to some embodiments of FIG. 2.

FIG. 3 is block diagram illustrating elements/functionalities of base station processor 101 of FIG. 2 supporting two codeword MIMO with 2 channel encoders and two rank MIMO downlink transmission according to some embodiments. According to embodiments of FIG. 3, two channel encoders CE1 and CE2 may be provided for two streams of transport data blocks B1 and B2, with symbols of one data input stream for wireless terminal 200 being mapped to as many as two different data transmission layers/streams X1 and X2. As shown, processor 101 may include transport data block generator 401, channel encoder 403, modulator 405, layer mapper 407, spreader/scrambler 409, and layer precoder 411. In embodiments of FIG. 3, channel encoder 403 may include channel encoders CE1 and CE2 for two streams of transport data blocks B1 and B2, modulator 405 may include interleavers/modulators IM1 and IM2, and layer mapper 407 may be configured to map resulting symbols of the two streams to as many as two different MIMO layers (streams) X1 and X2 as discussed in greater detail below. Moreover, adaptive controller 415 may be configured to control transport data block generator 401, channel encoder 403, modulator 405, layer mapper 407, and/or layer precoder 411 responsive to channel quality information (CQI) received as feedback from wireless terminal 200. According to some embodiments discussed herein, layer mapper 407 may perform a one-to-one mapping. According to some other embodiments, symbols generated responsive to codewords respectively generated by channel encoders CE1 and CE2 may be interleaved and distributed (mapped) to different MIMO layers.

Base station processor 101, for example, may receive an input data stream (e.g., from core network 70, from another base station, etc.) for transmission to wireless terminal 200, and transport data block generator 401 (including transport data block data generators TB1 and TB2) may provide a single stream of data blocks (for rank 1 transmissions) or separate the input data into two different streams of data blocks (for rank 2 transmissions).

For rank 1 transmissions (providing only 1 MIMO layer/stream), all input data of the input data stream may be processed through transport data block generator TB1 to provide a single stream of transport data blocks B1 (including individual transport data blocks b1-1, b1-2, b1-3, etc.) without using transport data block generator TB2 and without generating other layers/streams of transport data blocks B2. For rank 2 transmissions (providing 2 MIMO layers/streams), transport data block generator TB1 may generate a layer/stream of transport data blocks B1 (including individual transport data blocks b1-1, b1-2, b1-3, etc.), and transport data block generator TB2 may generate a stream of transport data blocks B2 (including individual transport data blocks b2-1, b2-2, b2-3, etc.).

Channel encoder 403 (including channel encoders CE1 and CE2) may encode the stream/streams of data blocks B1 and/or B2 generated by transport data block generator 401 to provide respective streams of codewords CW1 (including individual codewords cw1-1, cw1-2, cw1-3, etc.) and/or CW2 (including individual codewords cw2-1, cw2-2, cw2-3, etc.), for example, using turbo coding, convolutional coding, etc. Moreover, coding characteristics (e.g., coding rates) applied by channel encoders CE1 and CE2 may be separately determined by adaptive controller 415 responsive to wireless terminal 200 feedback (e.g., CQI regarding the downlink channel). For rank 1 transmissions, channel encoder 403 may generate a single stream of codewords CW1 responsive to the stream of data blocks B1 using only channel encoder CE1. For rank 2 transmissions, channel encoder 403 may generate two streams of codewords CW1 and CW2 responsive to respective streams of data blocks B1 and B2 using channel encoder CE1 and channel encoder CE2. Note that a codeword may be defined as the input data together with the CRC code provided by channel encoder 403. Stated in other words, a codeword may be defined as an output of a respective channel encoder CE1/CE2.

Modulator 405 (including interleaver/modulators IM1 and IM2) may interleave and modulate the stream/streams of codewords CW1 and/or CW2 generated by channel encoder 403 to provide respective streams of unmapped symbol blocks D1 (including unmapped symbol blocks $d^{(1)}$-1, $d^{(1)}$-2, $d^{(1)}$-3, etc.) and/or D2 (including unmapped symbol blocks $d^{(2)}$-1, $d^{(2)}$-2, $d^{(2)}$-3, etc.). For rank 1 transmissions (providing only 1 MIMO layer/stream), modulator 405 may generate a single stream of unmapped symbol blocks D1 responsive to the stream of codewords CW1 using only interleaver/modulator IM1. For rank 2 transmissions, modulator 405 may generate two streams of unmapped symbol blocks D1 and D2 responsive to respective streams of codewords CW1 and CW2 using interleaver/modulators IM1 and IM2. Modulator 405 may apply modulation orders responsive to input from adaptive controller 415 determined based on CQI feedback from wireless terminal 200.

In addition, each interleaver/modulator IM1 and/or IM2 may interleave data of two or more codewords of a stream so that two or more consecutive unmapped symbol blocks of a respective stream include symbols representing data of the two or more consecutive codewords. For example, data of consecutive codewords cw1-1 and cw1-2 of codeword stream CW1 may be interleaved and modulated to provide consecutive unmapped symbol blocks $d^{(1)}$-1 and $d^{(1)}$-2 of stream D1. Similarly, data of consecutive codewords cw2-1 and cw2-2 of codeword stream CW2 may be interleaved and modulated to provide consecutive unmapped symbol blocks $d^{(2)}$-1 and $d^{(2)}$-2 of stream D2. According to some embodiments, channel encoders CE1 and CE2 and interleaver/modulators IM1 and IM2 may apply different modulation and/or coding characteristics (e.g., different modulation orders and/or coding rates) during rank 2 transmissions to generate respective (differently coded) codewords and/or unmapped symbol blocks. According to some other embodiments, channel encoders CE1 and CE2 and/or interleaver/modulators IM1 and IM2 may be required to apply the same modulation and/or coding characteristics.

Symbols of streams of unmapped symbol blocks D1 and D2 may be mapped to respective streams of mapped symbol blocks X1 and X4 (for respective MIMO transmission layers), for example, using direct mappings. For rank 1 transmissions, layer mapper 407 may map symbols of unmapped symbol blocks $d^{(1)}$ (from stream D1) directly to mapped symbol blocks $x^{(1)}$ of stream X1. For rank 2 transmissions, layer mapper 407 may map symbols of unmapped symbol blocks $d^{(1)}$ (from stream D1) directly to mapped symbol blocks $x^{(1)}$ of stream X1, and layer mapper 407 may map symbols of unmapped symbol blocks $d^{(2)}$ (from stream D2) directly to mapped symbol blocks $x^{(2)}$ of stream X2.

Spreader/scrambler 409 may include two spreader/scramblers SS1 and SS2, and for mapped symbol streams X1 and X2 provided by layer mapper 407, spreader/scrambler 409 may generate respective streams Y1 and Y2 of spread symbol blocks (e.g., using a Walsh code). Layer precoder 411 may apply a MIMO precoding vector (e.g., by applying precoding weights) of the appropriate rank (based on wireless terminal feedback as interpreted by adaptive controller 415) to the streams of spread symbol blocks for transmission through transceiver 109 and antennas Ant-1 and Ant-2 of antenna array 117.

In embodiments of FIG. 3, base station processor 101 may support 2 layer MIMO transmissions with two channel encoders CE1 and CE2 generating respective codeword streams CW1 and CW2 and supporting two ACK/NACK HARQ processes (e.g., one HARQ process for each MIMO layer). Stated in other words, separate ACK/NACK reporting may be supported for both downlink MIMO layers for each MIMO TTI/TFRE. Wireless terminal 200 may thus transmit an ACK or a NACK for each MIMO layer used during a TTI/TFRE. Using feedback CQI (channel quality information) received from wireless terminal 200 (indicated by "feedback channel"), adaptive controller 415 may choose transport block length/lengths (to be applied by transport block generator 401), modulation order/orders (to be applied by modulator 405), and coding rate/rates (to be applied by encoder 403). Adaptive controller 415 may also identify precoding vectors (defining precoding weight information) used by layer precoder 411. For rank 1 transmissions, wireless terminal 200 may provide CQI including only one modulation order and only one code rate that are applied to the stream of codewords CW1 that are modulated and mapped directly to transmission layer X1. For rank 2 transmissions, wireless terminal 200 may provide CQI including a first modulation order and a first code rate that are applied to the stream of codewords CW1 that are modulated and mapped directly to transmission layer X1, and a second modulation order and a second code rate that are applied to the stream of codewords CW2 that are modulated and mapped directly to transmission layer X2. The first and second code rates and/or modulation orders may be the same or different.

Based on the rank chosen by adaptive controller 415, transport data blocks may be passed to encoder 403, and encoder outputs may be interleaved and modulated using modulator 405. Outputs of modulator 405 may be mapped to space time layers using layer mapper 407. The symbol stream(s) generated by layer mapper 407 may be spread and scrambled using spreader/scrambler 409, and layer precoder 411 may precode outputs of spreader/scrambler 409, with precoder outputs being passed through transceiver 109 and antenna array 117 (including Antennas Ant-1 and Ant-2).

At wireless terminal 200, operations of processor 201 may mirror operations of base station processor 101 when receiving the MIMO downlink communications transmitted by the base station. More particularly, elements/functionalities of wireless terminal processor 201 are illustrated in FIG. 4A mirroring elements/functionalities of base station processor 101 discussed above with reference to FIG. 3.

Radio signals may be received through MIMO antenna elements of MIMO antenna array 217 and transceiver 209, and the radio signals may be decoded by layer decoder 451 using a MIMO decoding vector to generate a plurality of MIMO decoded symbol layers X1' and/or X2' depending on MIMO rank used for transmission/reception. Layer Decoder 451 may use a decoding vector corresponding to the precoding vector used by base station 100. Layer decoder 451 may generate a single decoded symbol layer X1' for rank 1 reception, and layer decoder 451 may generate two decoded symbol layers X1' and X2' for rank 2 reception. Layer decoder 451 may thus perform a converse of operations performed by layer precoder 411 and spreader/scrambler 409 of base station 100. Layer decoder 451 may perform functionalities of a MIMO detector corresponding to a converse of layer precoder 411 (e.g., a minimum-mean-squared-error or MMSE receiver) to reduce multipath and/or other antenna interference. Layer decoder 451 may also perform functionalities of dispreading/descrambling blocks for each data stream/layer (corresponding to a converse of spreader/scrambler 409). Layer demapper 453 may function as a converse of layer mapper 407 to demap decoded symbol layers X1' and/or X2' to respective unmapped symbol layers D1' and D2' according to the transmission rank.

For rank one reception, layer demapper 453 may demap symbols of decoded symbol layer X1' blocks $x^{(1)'}$-j directly to symbols of unmapped symbol layer D1' blocks $d^{(1)'}$-j, demodulator/deinterleaver DM1 may demodulate/deinterleave unmapped symbol layer blocks $d^{(1)'}$-j to provide codewords cw1'-$j$ of codeword stream CW1' (also referred to as soft bits), and channel decoder CD1 may decode codewords cw1'-$j$ of codeword stream CW1' to provide transport blocks b1'-$j$ of stream B1'. Transport block generator 455 may then pass transport blocks b1'-$j$ of stream B1' as a received data stream. During rank one reception, demodulators/deinterleaver DM2 and channel decoder CD2 may be unused.

For rank two reception, layer decoder 451 may generate decoded symbol layers X1' and X2'. Layer demapper 453 may demap symbols of decoded symbol layer X1' blocks $x^{(1)'}$-j directly to symbols of unmapped symbol layer D1' blocks $d^{(1)'}$-j, and layer demapper 453 may demap symbols of decoded symbol layer X2' blocks $x^{(1)'}$-j directly to symbols of unmapped symbol layer D2' blocks $d^{(2)'}$-j. Demodulator/deinterleaver DM1 may demodulate/deinterleave unmapped symbol layer blocks $d^{(1)'}$-j to provide codewords cw1'-$j$ of codeword stream CW1' (also referred to as soft bits), and demodulator/deinterleaver DM2 may demodulate/deinterleave unmapped symbol layer blocks $d^{(2)'}$-j to provide codewords cw2'-$j$ of codeword stream CW2' (also referred to as soft bits). Channel decoder CD1 may decode codewords cw1'-$j$ of codeword stream CW1' to provide transport blocks b1'-$j$ of stream B1' (also referred to as hard bits), and channel decoder CD2 may decode codewords cw2'-$j$ of codeword stream CW2' to provide transport blocks b2'-$j$ of stream B2' (also referred to as hard bits). Transport block generator 455 may then combine transport blocks b1'-$j$ and b2'-$j$ of streams B1' and B2' into a received data stream.

Soft buffers SB1 and SB2 may be provided to support hybrid automatic repeat request (HARD) retransmissions as discussed in greater detail below. When a first demodulated codeword cw1'-1 fails decoding at channel decoder CD1 during rank 1 transmission/reception, for example, the first demodulated codeword cw1'-1 (also referred to as soft bits) may be saved in respective soft buffer SB1, a negative acknowledgment NACK may be transmitted to base station 100, the base station 100 may retransmit the data during a subsequent TTI/TFRE, demodulator/deinterleaver DM1 may generate a second demodulated codeword cw1'-1 (corresponding to the same data as the first demodulated codeword), and channel decoder CD1 may perform decoding using both the first and second demodulated codewords (e.g., soft bits corresponding to the same data). By using a combination of first and second demodulated codewords corresponding to the same data, a likelihood of successful decoding may thus be increased after a retransmission.

When a first demodulated codeword cw1'-1 fails decoding at channel decoder CD1 and a second demodulated codeword cw2'-1 passes decoding at channel decoder CD2 during an initial rank 2 transmission/reception TTI/TFRE, for example, the first demodulated codeword cw1'-1 (also referred to as soft bits) that failed decoding may be saved in respective soft buffer SB1, the decoded data block b2'-1 that passed decoding may be saved in decoded data buffer DB2, and negative acknowledgments NACKs may be transmitted to base station 100 for both MIMO layers. The base station 100 may then retransmit the data blocks b1-1 and b2-1 of both layers during a subsequent TTI/TFRE, and layer decoder 451 may reduce a component of the retransmission corresponding to the decoded data block b2'-1 (saved in decoded data buffer DB2) using interference cancellation techniques. For example, the decoded data block b2'-1 may be re-encoded using channel encoder CE2' (corresponding to channel encoder CE2), re-modulated using interleaver/modulator IM2' (corresponding to interleaver/modulator IM2), re-spread/re-scrambled using spreader/scrambler SS2' (corresponding to spreader/scrambler SS2), and precoded using precoder PC2' (corresponding to layer precoder 411), and an output of precoder PC2' may be used by layer decoder 451 to reduce interference to the first MIMO layer resulting from the second MIMO layer. By reducing interference due to the second MIMO layer (responsive to the demodulated codeword cw2'-1 that was successfully decoded during the first transmission), a relative strength of the first MIMO layer may be increased during the retransmission thereby increasing a likelihood of decoding the retransmitted data block b1-1 of the first MIMO layer. Demodulator/deinterleaver DM1 may then generate demodulated codeword cw1"-1 for the retransmission (corresponding to the same data as demodulated codeword cw1'-1 for the initial transmission), and channel decoder CD1 may perform decoding using both demodulated codewords cw1'-1 and cw1"-1 from the initial transmission and the retransmission (e.g., soft bits from the initial transmission provided by soft buffer SB1 and the from the retransmission provide by demodulator/deinterleaver DM1 corresponding to the same data). By using a combination of demodulated codewords from the initial transmission and the retransmission corresponding to the same data, a likelihood of successful decoding may thus be increased after a retransmission.

When a first demodulated codeword cw1'-1 fails decoding at channel decoder CD1 and a second demodulated codeword cw2'-1 passes decoding at channel decoder CD2 during an initial rank 2 transmission/reception TTI/TFRE, the decoded data block b2'-1 that passed decoding may be saved in decoded data buffer DB2, the demodulated codeword cw1'-1 (also referred to as soft bits) that failed decoding may be saved in respective soft buffer SB1, and negative acknowledgments NACKs may be transmitted to base station 100 for both MIMO layers. The base station 100 may then retransmit the data blocks b1-1 and b2-1 of both layers during a subsequent TTI/TFRE, and layer decoder 451 may reduce a component of the retransmission corresponding to the decoded data block b2'-1 (saved in decoded data buffer DB2) using interference cancellation techniques. For example, the decoded data block b2'-1 may be re-encoded using channel encoder CE2' (corresponding to channel encoder CE2), re-modulated using interleaver/modulator IM2' (corresponding to interleaver/modulator IM2), re-spread/re-scrambled using spreader/scrambler SS2' (corresponding to spreader/scrambler SS2), and precoded using precoder PC2' (corresponding to layer precoder 411), and an output of precoder PC2' may be used by layer decoder 451 to reduce interference to the first MIMO layer resulting from the second MIMO layer. By reducing interference due to the second MIMO layer (responsive to the demodulated codeword cw2'-1 that was successfully decoded during the first transmission), a relative quality/strength of the first MIMO layer may be increased during the retransmission thereby increasing a likelihood of decoding the retransmission of data block b1-1 of the first MIMO layer. Demodulator/deinterleaver DM2 may then generate demodulated codeword cw1"-1 for the retransmission (corresponding to the same data b1-1 as demodulated codeword cw1'-1 for the initial transmission), and channel decoder CD1 may perform decoding using both demodulated codewords cw1'-1 and cw1"-1 from the initial transmission and the retransmission (e.g., soft bits from the initial transmission provided by soft buffer SB1 and the from the retransmission provided by demodulator/deinterleaver DM1 corresponding to the same data). By using a combination of demodulated codewords from the initial transmission and the retransmission corresponding to the same data, a likelihood of successful decoding may thus be increased after a retransmission.

When a first demodulated codeword cw1'-1 passes decoding at channel decoder CD1 during rank 1 transmission/reception, a positive acknowledgment ACK may be transmitted to base station 100, and the base station 100 may transmit new data during a subsequent TTI/TFRE. When first and second demodulated codewords cw1'-1 and cw2'-1 pass decoding at channel decoder CD1 during rank 2 transmission/reception, positive acknowledgments ACKs for both MIMO layers may be transmitted to base station 100, and the base station 100 may transmit new data during a subsequent TTI/TFRE.

Decoded data buffers DB1 and DB2 may be provided to support interference reduction during retransmissions as discussed in greater detail below with respect to the flow charts of FIGS. 5A, 5B, and 5C. When a second demodulated codeword cw2'-1 is successfully decoded by channel decoder CD2 during rank 2 transmission/reception, for example, decoded data buffer DB2 may store the resulting received data block b2'-1 (also referred to as hard bits). If the other demodulated codeword cw1'-1 for the same initial TTI/TFRE is not successfully decoded by channel decoder CD1, however, both data blocks may be retransmitted by the base station, and the successfully decoded codeword b2'-1 (stored in decoded data buffer DB2) may be used to reduce a component of the retransmission corresponding to the successfully decoded data block b2'-1 (e.g., using interference cancellation techniques) to increase a probability of successfully decoding the corresponding demodulated codeword cw1'-1 from the retransmission.

Figure 4B:
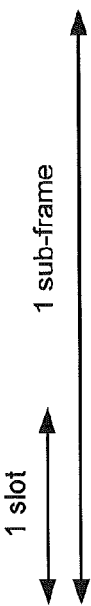
FIG. 4B is a block diagram illustrating a feedback channel used to report HARQ ACK/NACK messages and CQI/PCI information.
Figure 4A:
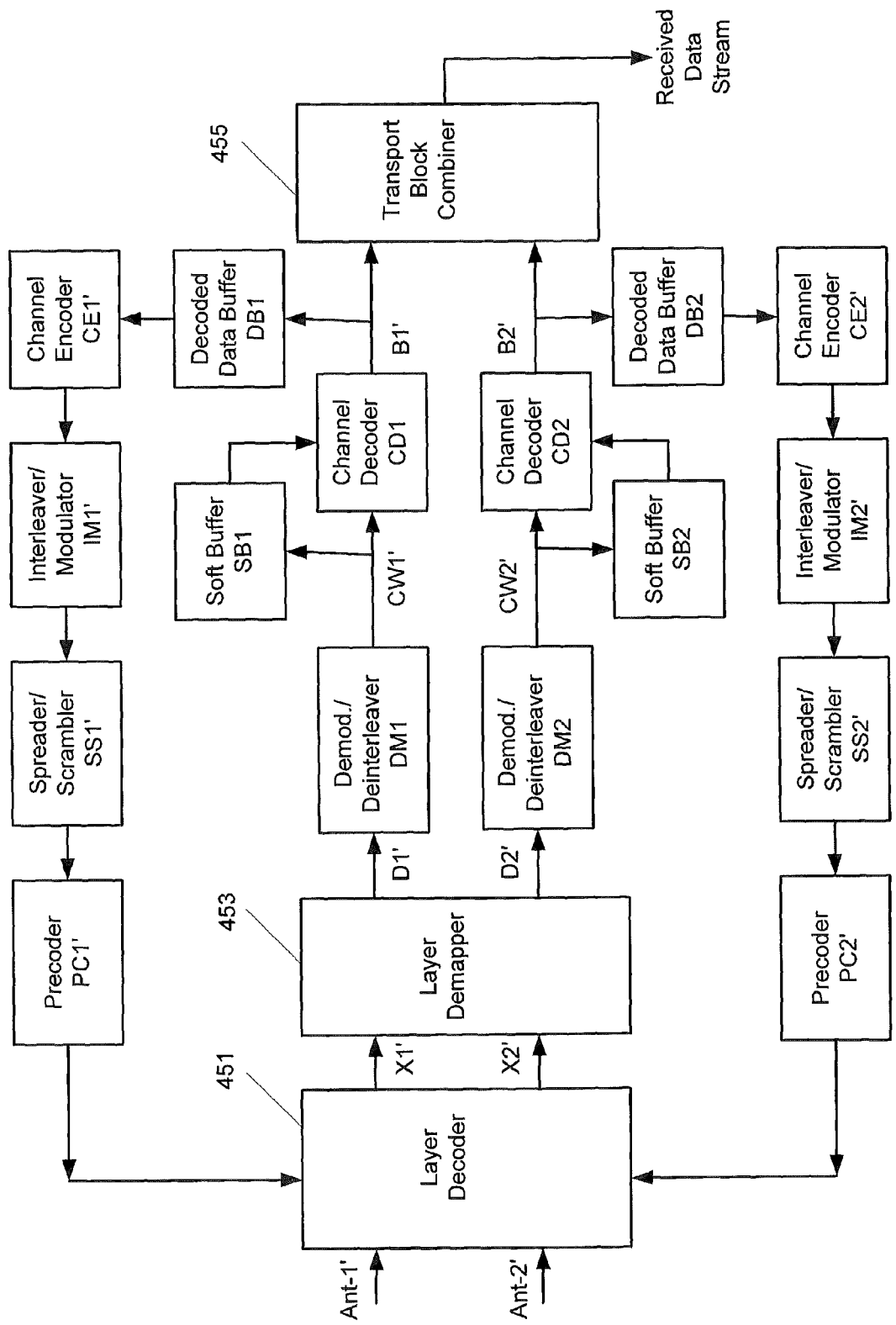
FIG. 4A is a block diagram illustrating elements/functionalities of wireless terminal processors according to some embodiments of FIG. 2.
Figures 6, 7:
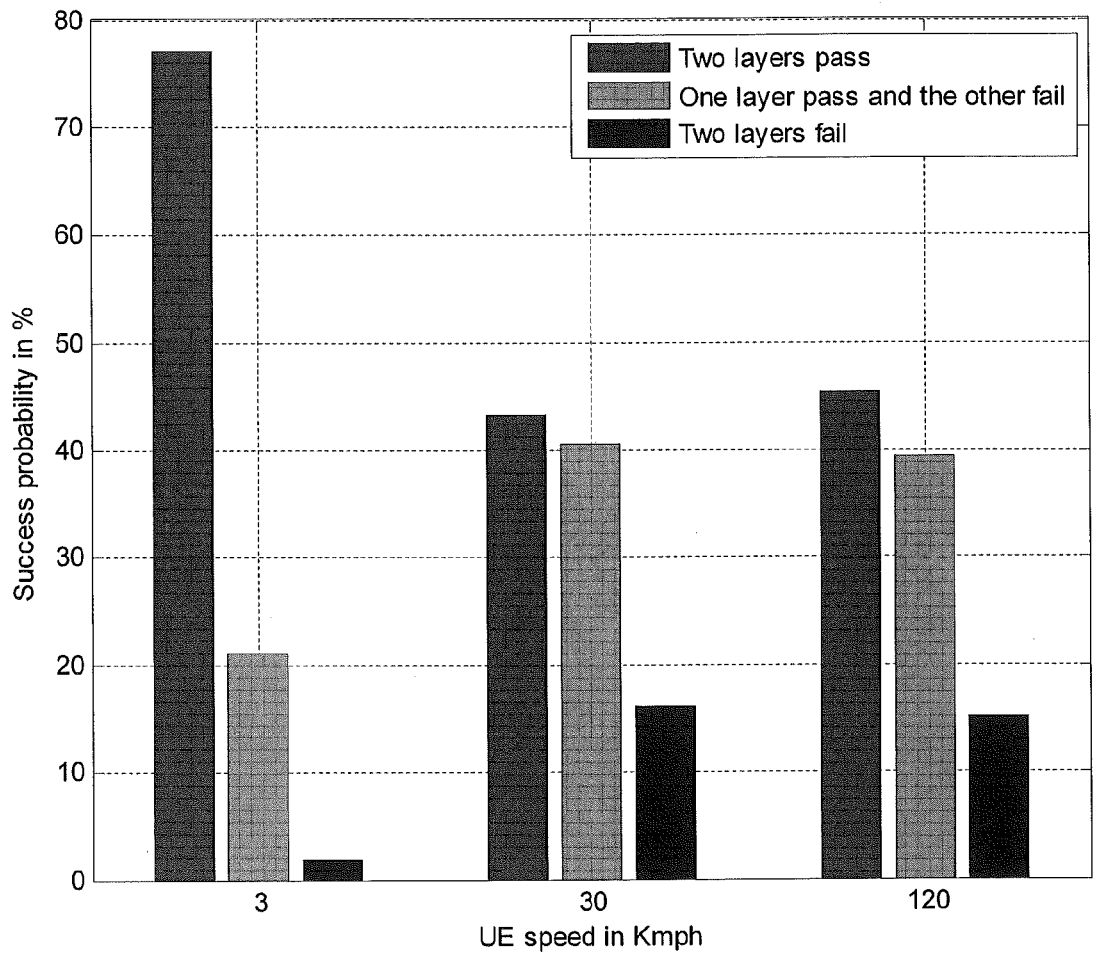
FIG. 6 is a graph illustrating probabilities of success/failure decoding 2 layer MIMO transmissions in a 2×2 MIMO system at different wireless terminal speeds.
FIG. 7 is a chart illustrating mappings of ACKs/NACKs according to some embodiments.

FIG. 4B is a block diagram illustrating a feedback channel used to report HARQ ACK/NACK messages and CQI/PCI information for two reporting intervals. FIG. 7 is a table illustrating ACK/NACK outputs (transmitted by wireless terminal 200 to base station 100) responsive to ACK/NACK inputs (generated by wireless terminal processor 201 responsive to decoder results) for rank 2 transmission/reception. For a rank 2l transmission/reception TTI/TFRE, wireless terminal processor 201 generates an ACK input if the channel decoder CD for the respective MIMO layer successfully decodes the respective demodulated codeword cwn'-j, or a NACK input if the channel decoder CD for the respective MIMIO layer does not successfully decode the respective demodulated codeword cwn'-j. As shown in the first row of FIG. 7, if both channel decoders CD1 and CD2 successfully decode the respective demodulated codewords cw1'-1 and cw2'-1 (resulting in two ACK inputs for the rank 2 transmission/reception), then wireless terminal processor 201 transmits a first ACK for the first MIMO layer and a second ACK for the second MIMO layer. As shown in the second, third, and fourth rows of FIG. 7, if either or both channel decoders CD1 and/or CD2 fails to successfully decode the respective demodulated codewords cw1'-1 and/or cw2'-1 (resulting in at least one NACK input for the rank 2 transmission/reception), then wireless terminal processor 201 transmits a first NACK for the first MIMO layer and a second NACK for the second MIMO layer.

According to some embodiments, when one demodulated codeword passes decoding and one demodulated codeword fails decoding during a rank 2 TTI/TFRE transmission/reception, one HARQ process input generates an ACK and the other HARQ process input generates a NACK. Even though one HARQ process input is an ACK, wireless terminal processor 201 transmits/reports NACK outputs for both rank 2 MIMO layers as shown in rows 2 and 3 of FIG. 7. Accordingly, base station 100 will retransmit both data blocks during a subsequent TTI/TFRE even though one was successfully decoded during the initial transmission. During the retransmission, wireless terminal processor 201 can use information from the successfully received data block (saved in a respective decoded data buffer) during the retransmission to increase a likelihood of decoding the data block that failed decoding during the initial transmission/reception. By reporting two NACKs from wireless terminal 200 during a rank 2 transmission when only one data block fails decoding, base station operations may remain unchanged.

As discussed above with respect to FIG. 4A, a channel encoder CE', an interleaver/modulator IM', a spreader/scrambler SS', and a precoder PC' may be used during the retransmission to generated a coded version of the data block that passed decoding. The coded version of the successfully decoded data block may thus be used by layer decoder 451 to remove/reduce interference due to the successfully decoded data block in the retransmission. Stated in other words, layer decoder 451 may use the coded version of the successfully decoded data block to reduce multi-antenna/multi-layer interference in the retransmission for the data block that failed decoding during the initial transmission. A received signal quality for the data block that failed initial decoding may thus be increased during the retransmission to increase a likelihood of decoding the initially failed data block during the retransmission.

Operations of wireless terminal processor 201 are discussed in greater detail below with respect to the flow charts of FIGS. 5A, 5B, and 5C. At block 541, wireless terminal processor 201 may receive an initial transmission of first and second transmitted data blocks b1-1 and b2-1 over respective first and second multiple-input-multiple-output (MIMO) layers during a rank 2 transmission time interval (TTI). More particularly, base station 100 may transmit information over a downlink signaling channel identifying the data blocks as initial transmissions, and base station 100 may transmit the first and second data blocks over a downlink traffic channel. Processor 201 may receive these transmissions through antenna array 217 and transceiver 209. Because this is an initial transmission of the first and second data blocks b1-1 and b2-1, wireless terminal processor 201 may clear soft buffers SB1 and SB2 at block 543. Wireless terminal processor 201 may also clear decoded data buffers DB1 and DB2 for an initial transmission.

At block 545, demodulators/deinterleavers DM1 and DM2 of processor 201 may generate respective first and second demodulated codewords cw1'-1 and cw2'-1 corresponding to the initial transmission of the first and second transmitted data blocks b1-1 and b2-1, and at block 547, processor 201 may save the first and second demodulated codewords cw1'-1 and cw2'-1 in respective soft buffers SB1 and SB2 (for use if needed for decoding during retransmission). At block 549, processor 201 may decode the first and second demodulated codewords cw1'-1 and cw2'-1 using channel decoders CD1 and CD2.

Responsive to success decoding both codewords cw1'-1 and cw2'-1 at block 551, processor 201 may transmit a positive acknowledgment for both codewords (corresponding to data blocks b1-1 and b2-1) as discussed above with respect to row 1 of FIG. 7. More particularly, processor 201 may transmit a first positive acknowledgment ACK-1 for data block b1-1 and a second positive acknowledgment ACK-2 for data block b2-1 through transceiver 209 and antenna array 217. Processor 201 may thus generate data blocks b1'-1 and b2'-1 (corresponding to b1-1 and b2-1) at outputs of channel decoders CD1 and CD2, and at block 555, transport block combiner 455 may combine data blocks b1'-1 and b2'-1 into the received data stream. Because both data blocks b1-1 and b2-1 have been successfully received and decoded, processor 201 may return to block 541 to receive an initial transmission of two new data blocks (e.g., b1-2 and b2-2) during a subsequent TTI.

Responsive to failure decoding one of the demodulated codewords (e.g., failure decoding codeword cw1'-1 corresponding to data block b1-1) and success decoding the other demodulated codeword (e.g., success decoding codeword cw2'-1 corresponding to data block b2-1) at block 551, processor 201 may transmit a negative acknowledgment for both codewords (corresponding to data blocks b1-1 and b2-1) at block 557 indicating failure receiving data blocks b1-1 and b2-1. More particularly, transmitting the negative acknowledgment may include transmitting a first negative acknowledgment NACK-1 for the first codeword cw1'-1 indicating failure receiving the first transmitted data block b1-1 and transmitting a second negative acknowledgment NACK-2 for the second codeword cw2'-1 indicating failure receiving the second transmitted data block b2-1.

Figure 5A:
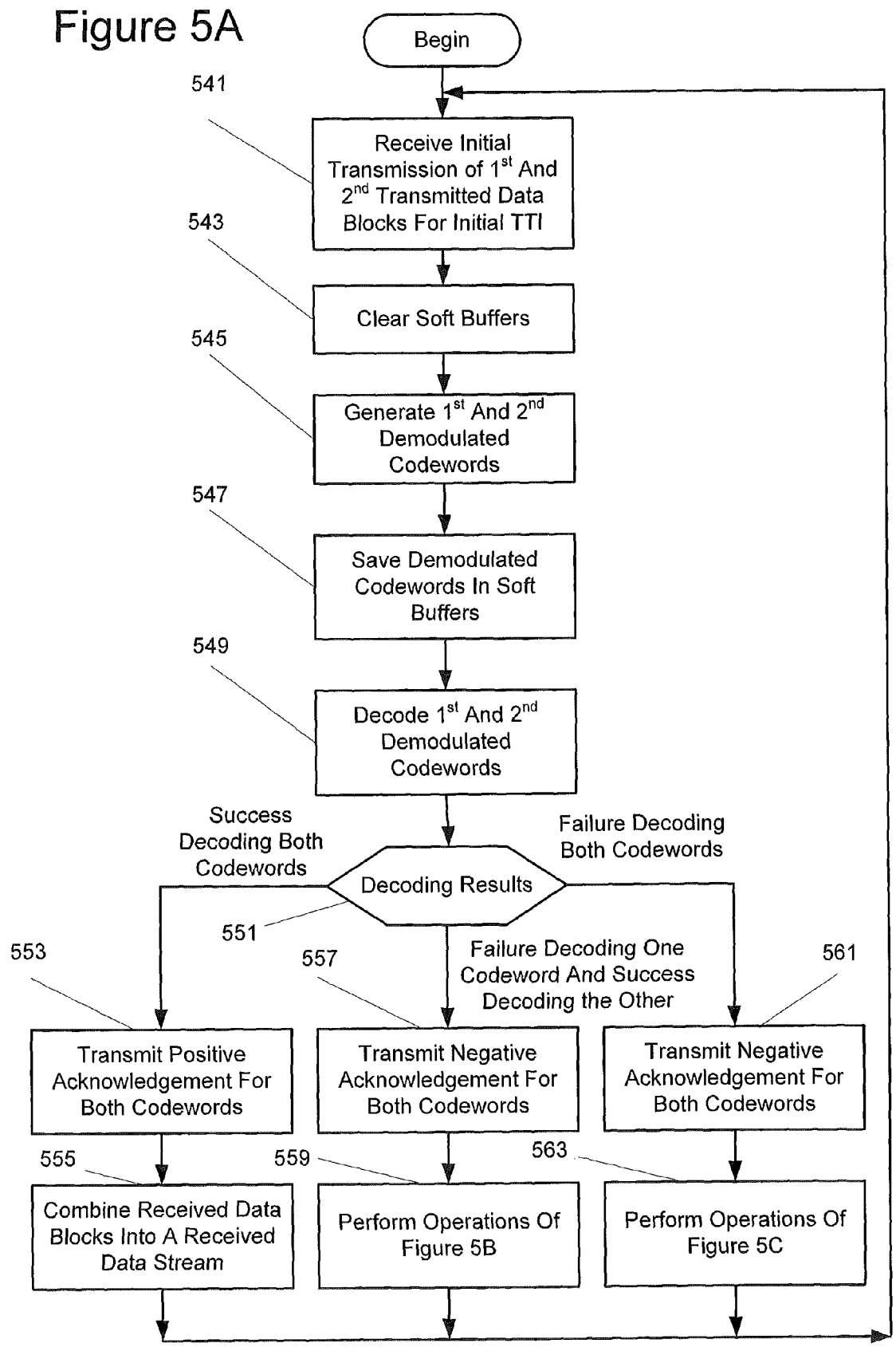
FIGS. 5A, 5B, and 5C are flow charts illustrating operations of wireless terminal processors according to some embodiments of FIG. 2.
Figure 5B:
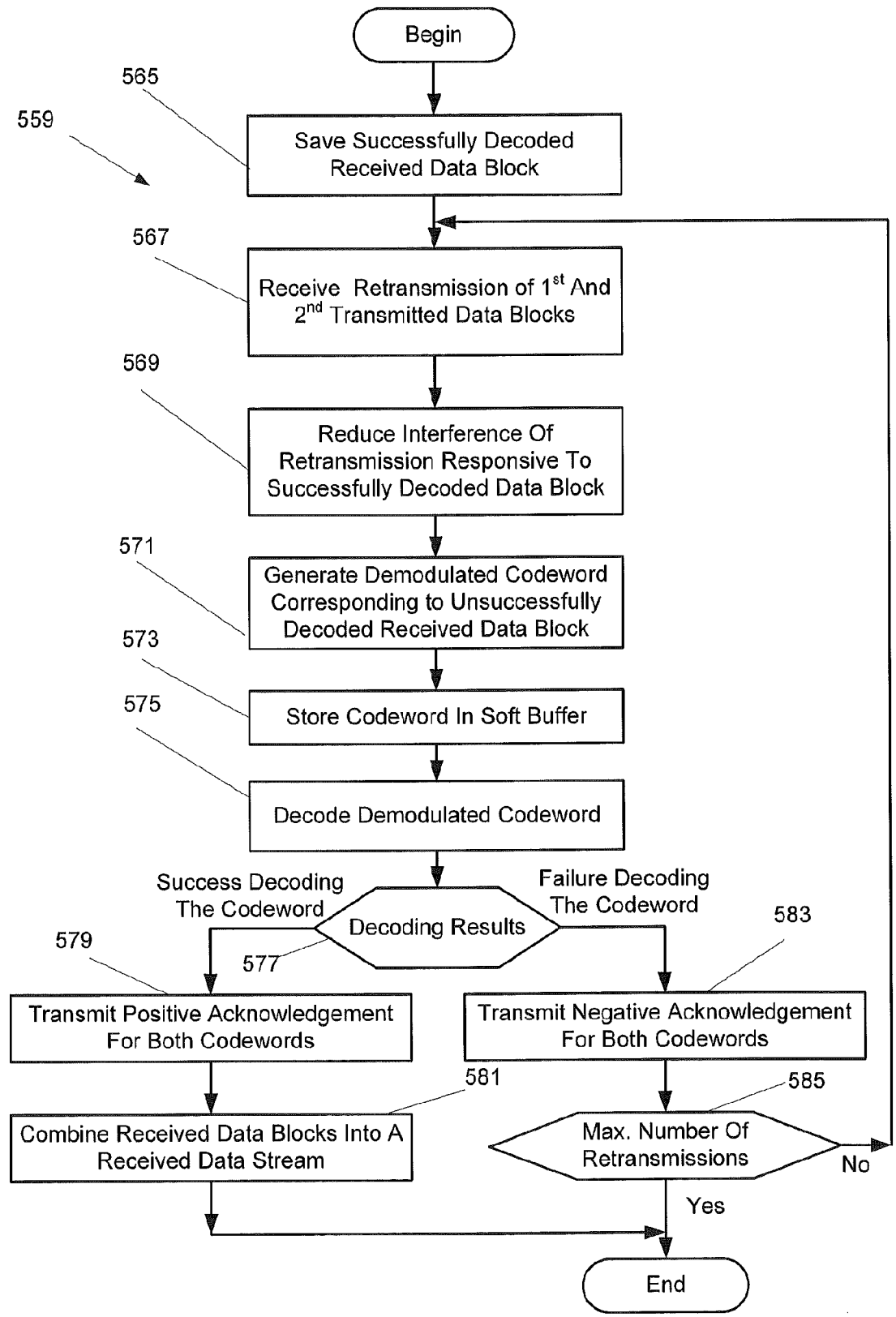

Further responsive to failure decoding one demodulated codeword and success decoding the other demodulated codeword, processor 201 may proceed with operations of FIG. 5B at block 559. More particularly, processor 201 may save the successfully decoded data block b2'-1 generated by channel decoder CD2 in decoded data buffer DB2 at block 565 to reducing interference relative to the unsuccessfully decoded data block b1-1 during a retransmission.

As discussed above with respect to block 557, a negative acknowledgment NACK for both codewords may be transmitted to base station 100, and responsive to the negative acknowledgment, base station 100 may retransmit both of the first and second data blocks b1-1 and b2-1 during a subsequent TTI/TFRE. More particularly, base station 100 may transmit information over the downlink signaling channel identifying the data blocks as retransmissions, and base station 100 may retransmit the first and second data blocks over a downlink traffic channel. At block 567, processor 201 may receive the retransmission of the first and second transmitted data blocks b1-1 and b2-1 over the respective first and second MIMO layers during the subsequent rank 2 TTI/TFRE. Processor 201 may receive these retransmissions through antenna array 217 and transceiver 209. Because this is a retransmission of the first and second data blocks b1-1 and b2-1, wireless terminal processor 201 may maintain the demodulated codewords cw1'-1 and cw2'-2 from the initial transmission in respective soft buffers SB1 and SB2. Demodulated codeword cw1'-1 (saved in soft buffer SB1) that failed decoding during the initial transmission may thus be used to improve decoding during the retransmission to increase a likelihood of successfully receiving data block b1-1 during the retransmission.

Responsive to the retransmission of b1-1 and b2-1, layer decoder 451 and layer demapper 453 may generate symbols d1"-1 corresponding to the retransmission of data block b1-1 that failed decoding during the initial transmission. At block 569, layer decoder 451 may use the successfully decoded data block b2'-1 (saved in decoded data buffer DB2) from the initial transmission of b1-1 and b2-1 to reduce interference in the retransmission with respect to data block b1-1 that failed decoding during the initial transmission. More particularly, processor 201 may encode data block b2'-1 using channel encoder CE2' (applying a same code as the retransmission), modulate/interleave data block b2'-1 using interleaver/modulator IM2' (applying a same modulation as the retransmission), spread/scramble data block b2'-1 using spreader/scrambler SS2' (applying a same spreading/scrambling algorithm as the retransmission), and precoding data block b2'-1 using precoder PC2' (applying a same precoding vector as the retransmission) to generate a coded version of data block b2'-1. The coded version of data block b2'-1 may then be used by layer decoder 451 to reduce/remove components of data block b2-1 from the retransmission to thereby reduce interference relative to the retransmission of b1-1.

Layer decoder 451 and layer demapper 453 may then generate demodulated codeword cw1"-1 corresponding to the retransmission of data block b1-1 at block 571. At block 573, demodulated codeword cw1"-1 may be stored in soft buffer SB1 for use if needed during a next retransmission if codeword cw1"-1 fails decoding. Because interference from b2-1 in the retransmission has been reduced using the coded version of data block b2'-1 before generating demodulated codeword cw1"-1 from the retransmission, a likelihood of successfully decoding demodulated codeword cw1"-1 from the retransmission may be improved.

At block 575, processor 201 may attempt decoding of demodulated codeword cw1"-1 using channel decoder CD1. More particularly, processor 201 may decode demodulated codeword cw1"-1 responsive to demodulated codeword cw1"-1 generated by demodulator/deinterleaver DM1 during the retransmission and responsive to demodulated codeword cw1'-1 saved in soft buffer SB1 from the initial transmission.

Responsive to success decoding demodulated codeword cw1"-1 from the retransmission at block 577, processor 201 may transmit positive acknowledgment indicating success receiving the first and second transmitted data blocks b1-1 and b2-1. More particularly, processor 201 may transmit a first positive acknowledgment ACK for data block b1-1 and a second positive acknowledgment for data block b2-1 through transceiver 209 and antenna array 217. Processor 201 may thus generate data block b1"-1 (corresponding to b1-1) at the output of channel decoder CD1, and processor 201 may retrieve data block b2'-1 from decoded data buffer DB2. At block 581, transport block combiner 455 may combine data blocks b1"-1 and b2'-1 into the received data stream. Because both data blocks b1-1 and b2-1 have been successfully received and decoded, processor 201 may return to block 541 of FIG. 1 to receive an initial transmission of two new data blocks (e.g., b1-2 and b2-2) during a subsequent TTI.

Response to failure decoding demodulated codeword cw1"-1 from the retransmission at block 577, processor 201 may transmit a negative acknowledgment indicating failure receiving data blocks b1-1 and b2-1 at block 583. As discussed above with respect to block 557, transmitting the negative acknowledgment may include transmitting a first negative acknowledgment NACK-1 indicating failure receiving data block b1-1 and transmitting a second negative acknowledgment NACK-2 indicating failure receiving data block b1-1. In addition, processor 201 may save codeword cw1"-1 using soft buffer SB1 and maintain data block b2'-1 in decoded data buffer DB2 for use during a subsequent retransmission.

Further responsive to failure decoding demodulated codeword cw1"-1 at block 577, processor 201 may determine if a maximum number of transmission/retransmissions of data block b1-1 have occurred. If so, processor 201 may return to block 541 of FIG. 5A to receive an initial transmission of new data blocks b1-2 and b2-2. If not, processor may return to block 567 of FIG. 5B to receive another retransmission of data blocks b1-1 and b2-1. Operations of blocks 567, 569, 571, 573, 575, 577, 583, and 585 may be repeated until either data block b1-1 is successfully decoded at block 577 or a maximum number of retransmissions have taken place at block 585.

Given that demodulated codeword cw1"-1 fails decoding at block 577, a second retransmission of data blocks b1-1 and b2-1 may be received by processor 201 over the respective first and second MIMO layers during a third transmission time interval at block 567.

Responsive to the second retransmission of b1-1 and b2-1, layer decoder 451 and layer demapper 453 may generate symbols d1'"-1 corresponding to the retransmission of data block b1-1 that failed decoding during the initial transmission and during the first retransmission. At block 569, layer decoder 451 may use the successfully decoded data block b2'-1 (saved in decoded data buffer DB2) from the initial transmission of b1-1 and b2-1 to reduce interference in the second retransmission with respect to data block b1-1 that failed decoding during the initial transmission and the first retransmission. More particularly, processor 201 may encode data block b2'-1 using channel encoder CE2' (applying a same code as the retransmission), modulate/interleave data block b2'-1 using interleaver/modulator IM2' (applying a same modulation as the retransmission), spread/scramble data block b2'-1 using spreader/scrambler SS2' (applying a same spreading/scrambling algorithm as the retransmission), and precoding data block b2'-1 using precoder PC2' (applying a same precoding vector as the retransmission) to generate a coded version of data block b2'-1. The coded version of data block b2'-1 may then be used by layer decoder 451 to reduce/remove components of data block b2-1 from the second retransmission to thereby reduce interference relative to the second retransmission of b1-1.

Layer decoder 451 and layer demapper 453 may then generate demodulated codeword cw1'"-1 corresponding to the retransmission of data block b1-1 at block 571. At block 573, demodulated codeword cw1'"-1 may be stored in soft buffer SB1 for use if needed during a next retransmission if codeword cw1'"-1 fails decoding. Because interference from b2-1 in the second retransmission has been reduced using the coded version of data block b2'-1 before generating demodulated codeword cw1'"-1 from the retransmission, a likelihood of successfully decoding demodulated codeword cw1'"-1 from the retransmission may be improved.

At block 575, processor 201 may attempt decoding of demodulated codeword cw1'"-1 using channel decoder CD1. More particularly, processor 201 may decode demodulated codeword cw1'"-1 responsive to demodulated codeword cw1'"-1 generated by demodulator/deinterleaver DM1 during the second retransmission, responsive to demodulated codeword cw1"-1 saved in soft buffer SB1 from the first retransmission, and/or responsive to demodulated codeword cw1'-1 saved in soft buffer SB1 from the initial transmission.

Responsive to success decoding demodulated codeword cw1'"-1 from the second retransmission at block 577, processor 201 may transmit positive acknowledgment indicating success receiving the first and second transmitted data blocks b1-1 and b2-1. More particularly, processor 201 may transmit a first positive acknowledgment ACK-1 for data block b1-1 and a second positive acknowledgment ACK-2 for data block b2-1 through transceiver 209 and antenna array 217. Processor 201 may thus generate data block b1'"-1 (corresponding to b1-1) at the output of channel decoder CD1, and processor 201 may retrieve data block b2'-1 from decoded data buffer DB2. At block 581, transport block combiner 455 may combine data blocks b1'"-1 and b2'-1 into the received data stream. Because both data blocks b1-1 and b2-1 have been successfully received and decoded, processor 201 may return to block 541 of FIG. 1 to receive an initial transmission of two new data blocks (e.g., b1-2 and b2-2) during a subsequent TTI.

Response to failure decoding demodulated codeword cw1'"-1 from the second retransmission at block 577, processor 201 may transmit negative acknowledgment indicating failure receiving data blocks b1-1 and b2-1, at block 583, and processor 201 may save codeword cw1'"-1 using soft buffer SB1 and maintain data block b2'-1 in decoded data buffer DB2 for use during a subsequent retransmission. As discussed above, processor may return to block 567 of FIG. 5B to receive another retransmission of data blocks b1-1 and b2-1, and operations of blocks 567, 569, 571, 573, 575, 577, 583, and 585 may be repeated until either data block b1-1 is successfully decoded at block 577 or a maximum number of retransmissions have taken place at block 585. For example, a maximum of 4 to 6 retransmissions may be allowed.

Returning to the initial transmission at FIG. 5A, responsive to failure decoding both demodulated codewords cw1'-1 (corresponding to data block b1-1) and cw2'-1 (corresponding to data block b2-1) at block 551, processor 201 may transmit a negative acknowledgment for both codewords (corresponding to data blocks b1-1 and b2-1) at block 561 indicating failure receiving data blocks b1-1 and b2-1. More particularly, transmitting the negative acknowledgment may include transmitting a first negative acknowledgment NACK-1 for codeword cw1'-1 indicating failure receiving data block b1-1 and transmitting a second negative acknowledgment NACK-2 for codeword cw2'-1 indicating failure receiving data block b1-1.

Figure 5C:
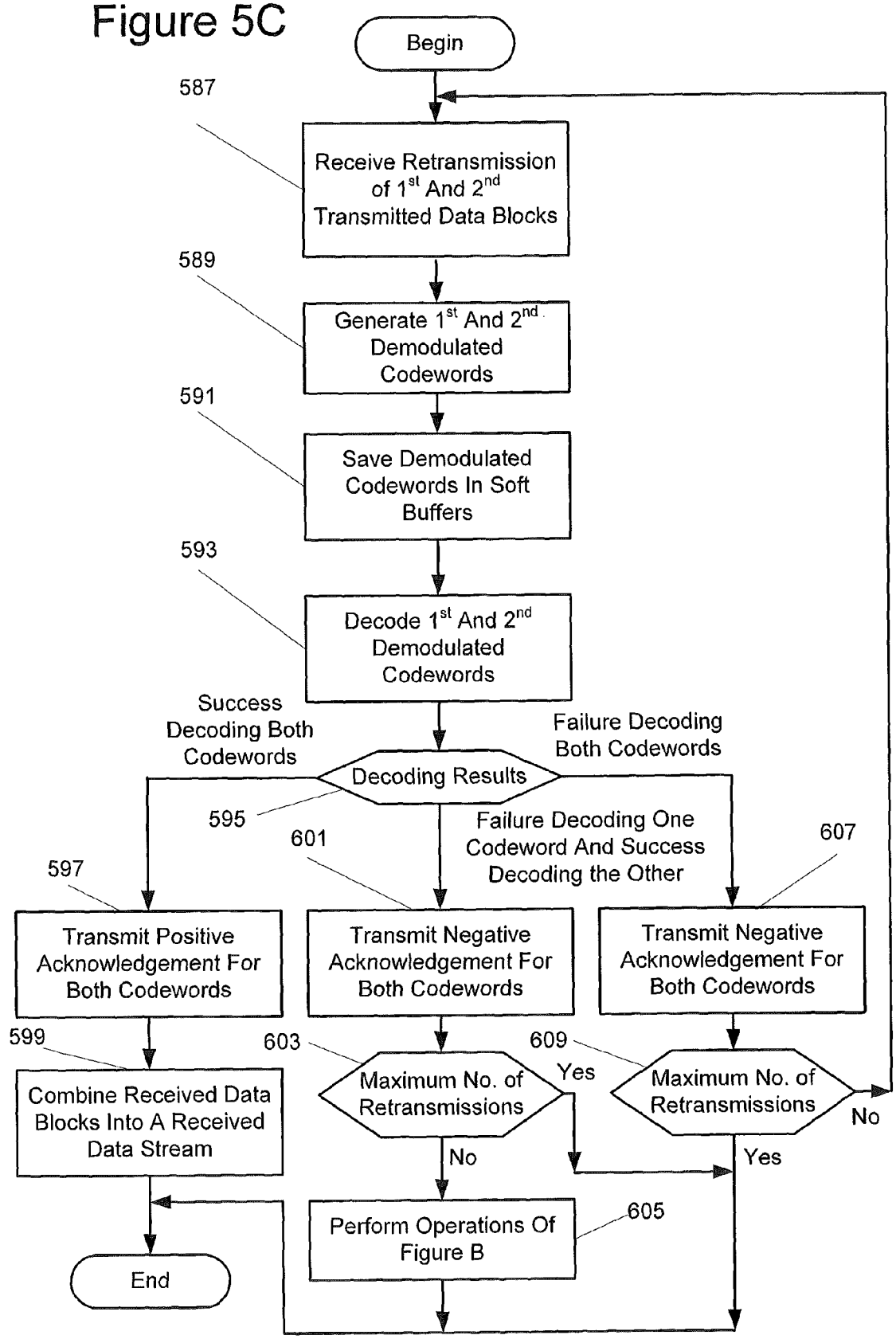

Further responsive to failure decoding both codewords cw1'-1 and cw2-1, processor 201 may proceed to block 587 of FIG. 5C to receive the retransmission of the first and second transmitted data blocks b1-1 and b2-1 over the respective first and second MIMO layers during the subsequent rank 2 TTI/ TFRE. Processor 201 may receive these retransmissions through antenna array 217 and transceiver 209. Because this is a retransmission of the first and second data blocks b1-1 and b2-1, wireless terminal processor 201 may maintain the demodulated codewords cw1'-1 and cw2'-2 from the initial transmission in respective soft buffers SB1 and SB2. Demodulated codewords cw1'-1 and cw2'-1 (saved in soft buffers SB1 and SB2) that failed decoding during the initial transmission may thus be used to improve decoding during the retransmission to increase a likelihood of successfully receiving data blocks b1-1 and b2-1 during the retransmission.

At block 589, demodulators/deinterleavers DM1 and DM2 of processor 201 may generating respective first and second demodulated codewords cw1"-1 and cw2"-1 corresponding to the retransmission of the first and second transmitted data blocks b1-1 and b2-1, and at block 591, processor 201 may save demodulated codewords cw1"-1 and cw2"-1 in respective soft buffers SB1 and SB2 (for use if needed for decoding during a subsequent retransmission). At block 593, processor 201 may decode demodulated codewords cw1"-1 and cw2"-1 of the retransmission using channel decoders CD1 and CD2. To increase a likelihood of decoding demodulated codeword cw1"-1, channel decoder CD1 may use demodulated codeword cw1"-1 from the retransmission and demodulated codeword cw1'-1 from the initial transmission (saved in soft buffer SB2). To increase a likelihood of decoding demodulated codeword cw2"-1, channel decoder CD2 may use demodulated codeword cw2"-1 from the retransmission and demodulated codeword cw2'-1 from the initial transmission (saved in soft buffer SB2).

Responsive to success decoding both codewords cw1"-1 and cw2"-1 of the retransmission at block 595, processor 201 may proceed with operations of blocks 597 and 599 which are substantially the same as operations of blocks 553 and 555 of FIG. 5B. Further responsive to success decoding both codewords at block 595, processor 201 may proceed to block 541 of FIG. 5A to receive an initial transmission of new data blocks.

Responsive to failure decoding one of codewords cw1"-1 or cw2"-1 and success decoding the other of codewords cw1"-1 or cw2"-1 at block 595, processor 201 may transmit negative acknowledgement for both codewords at block 601 and determine if a maximum number of retransmissions of data blocks b1-1 and b2-1 have been attempted at block 603. If not, processor 201 may proceed at block 605 to block 565 of FIG. 5B. If so, processor 201 may proceed to block 541 of FIG. 5A to receive an initial transmission of new data blocks. Operations of block 601 may the substantially the same as operations of block 557, and operations of block 603 may be substantially the same as operations of block 585 of FIG. 5B.

Responsive to failure decoding both codewords cw1"-1 and cw2"-1 of the retransmission at block 595, processor may transmit negative acknowledgement for both codewords at block 607 and determine if a maximum number of retransmissions of data blocks b1-1 and b2-1 have been attempted at block 609. If not, processor 201 may repeat operations of blocks 587, 589, 591, 593, 595, 597, 599, 601, 603, 607, and/or 608 until either both codewords are successfully decoded at block 595 or until a maximum number of retransmissions have occurred at blocks 603 or 609. If so, processor 201 may proceed to block 541 of FIG. 5A to receive an initial transmission of new data blocks. Operations of block 607 may be the substantially the same as operations of block 561, and operations of block 609 may be substantially the same as operations of block 585 of FIG. 5B.

By increasing a likelihood of decoding a failed data block during a retransmission according to some embodiments, performance gains may be achieved and/or processing power may be reduced. If wireless terminal 200 transmits a HARQ ACK/NACK message for each HARQ process, wireless terminals may be implemented according to embodiments of the present invention without requiring change at base stations, and scheduler implementation may thus be relatively easy at a base station (such as a low cost pico base station). Moreover, embodiments of the present invention may be suitable for delay sensitive applications because a likelihood of successful decoding during a retransmission may be increased thereby reducing RLC (Radio Link Control) retransmissions. In addition, embodiments may be applied, for example, for LTE, HSDPA, and/or Wi-Max, for downlink and/or uplink transmission/reception.

During rank 2 MIMO transmission/reception, a first MIMO layer (including TB1, CE1, IM1, DM1, and/or CD1) may support transmission/reception of data blocks b1-1, b1-2, b1-3, etc., and a second MIMO layer (including TB1, CE1, IM1, DM1, and/or CD1) may support transmission/ reception of data blocks b1-1, b1-2, b1-3, etc. Accordingly, b1-1 and b2-1 may be transmitted over the respective MIMO layers during a first MIMO TTI, b1-2 and b2-2 may be transmitted over the respective MIMO layers during a second MIMO TTI, b1-3 and b2-3 may be transmitted over the respective MIMO layers during a third MIMO TTI, etc. Moreover, first and second HARQ processes may be assigned to the respective MIMO layers. Accordingly, the first HARQ process generates respective first ACK/NACK messages (ACK-1 or NACK-1) for each MIMO TTI for the first MIMO layer, and the second HARQ process generates respective second ACK/NACK messages (ACK-2 or NACK-2) for each MIMO TTI for the second MIMO layer.

While retransmissions are discussed above by way of example, with respect to failure decoding a data block b1-1 of a first MIMO layer and success decoding a data block b2-1 of a second MIMO layer transmitted during a same rank 2 TTI, the same/similar operations apply with respect to failure decoding a data block b2-1 of a second MIMO layer and success decoding a data block b1-1 of a first MIMO layer transmitted during a same rank 2 TTI. While retransmissions are discussed above by way of example with respect HARQ processes that are dedicated to single MIMO layers, the same/ similar operations may apply with respect to bundled HARQ processes that share multiple MIMO layers. During a rank 4 transmission, first and fourth MIMO layers may be bundled to a first HARQ process, and second and third MIMO layers may be bundled to a second HARQ process. During a rank 4 downlink TTI, four data blocks may be transmitted over the respective MIMO layers. If one of the data blocks passes decoding and any of the other data blocks fail decoding, the first and second HARQ processes may generate NACKs for the downlink TTI requesting retransmission of all four data blocks. During the retransmission, the wireless terminal processor 201 may use any successfully decoded data blocks from the initial transmission to reduce interference for any unsuccessfully decoded data blocks during the retransmission as discussed above, and retransmissions may be repeated either until all data blocks are successfully decoded or a maximum number of retransmission has been reached. Embodiments of the present invention may thus be applied to higher order MIMO systems (e.g., 4 antenna systems supporting up to 4 MIMO layers, 8 antenna systems supporting up to 8 MIMO layers, etc.).

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the invention. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope That which is claimed is:

1. A method of operating a terminal in a radio access network:
   receiving a transmission of first and second data blocks over respective first and second multiple-input-multiple-output, MIMO, layers during a first transmission time interval, TTI;
   generating respective first and second demodulated codewords corresponding to the transmission of the first and second data blocks;
   decoding the first and second demodulated codewords;
   responsive to failure decoding the first demodulated codeword and success decoding the second demodulated codeword, transmitting a negative acknowledgement indicating failure receiving the first and second data blocks;
   after transmitting the negative acknowledgment, receiving a retransmission of the first and second data blocks over the respective first and second MIMO layers during a second transmission time interval;
   reducing interference of the retransmission responsive to the second demodulated codeword;
   responsive to reducing the interference of the retransmission, generating a third demodulated codeword corresponding to the retransmission of the first data block; and
   decoding the third demodulated codeword.

2. The method according to claim 1 wherein transmitting the negative acknowledgment comprising transmitting a first negative acknowledgment corresponding to the first demodulated codeword indicating failure receiving the first data block and transmitting a second negative acknowledgment corresponding to the second demodulated codeword indicating failure receiving the second data block.

3. The method according to claim 1 wherein decoding the third demodulated codeword comprises decoding the third demodulated codeword responsive to the first and the third demodulated codewords.

4. The method according to claim 1 further comprising:
   responsive to success decoding the third demodulated codeword, transmitting a positive acknowledgment indicating success receiving the first and second data blocks.

5. The method according to claim 4 wherein decoding the second demodulated codeword comprises generating a second received data block corresponding to the second data block, and wherein decoding the third demodulated codeword comprises generating a first received data block corresponding to the first data block, the method further comprising:
   combining the first and second received data blocks into a received data stream.

6. The method according to claim 1 wherein the negative acknowledgement comprises a first negative acknowledgement, the method further comprising:
   responsive to failure decoding the third demodulated codeword, transmitting a second negative acknowledgement indicating failure receiving the first and second data blocks.

7. The method according to claim 6 wherein the retransmission comprises a first retransmission, the method further comprising:
   after transmitting the second negative acknowledgment, receiving a second retransmission of the first and second data blocks over the respective first and second MIMO layers during a third transmission time interval;
   reducing interference of the second retransmission, responsive to the second demodulated codeword;
   responsive to reducing interference of the second retransmission, generating a fourth demodulated codeword corresponding to the second retransmission of the first data block; and
   decoding the fourth demodulated codeword.

8. The method according to claim 7 decoding the fourth demodulated codeword comprises decoding the fourth demodulated codeword responsive to the fourth demodulated codeword and responsive to at least one of the first demodulated codeword and/or the third demodulated codeword.

9. The method according to claim 7 wherein decoding the second demodulated codeword comprises generating a second received data block corresponding to the second data block, and wherein decoding the fourth demodulated codeword comprises generating a first received data block corresponding to the first data block, the method further comprising:
   responsive to success decoding the fourth demodulated codeword, transmitting a positive acknowledgment indicating success receiving the first and second data blocks; and
   combining the first and second received data blocks into a received data stream.

10. A terminal operating in a radio access network, the terminal comprising:
    a transceiver configured to transmit and/or receive communications over a channel; and
    a processor coupled to the transceiver, wherein the processor is configured to:
      receive a transmission of first and second data blocks over respective first and second multiple-input-multiple-output layers through the transceiver during a first transmission time interval,
      generate respective first and second demodulated codewords corresponding to the transmission of the first and second data blocks,
      decode the first and second demodulated codewords,
      transmit a negative acknowledgement through the transceiver indicating failure receiving the first and second data blocks responsive to failure decoding the first demodulated codeword and success decoding the second demodulated codeword,
      receive a retransmission of the first and second data blocks over the respective first and second MIMO layers during a second transmission time interval after transmitting the negative acknowledgment,
      reduce interference of the retransmission responsive to the second demodulated codeword,
      generate a third demodulated codeword corresponding to the retransmission of the first data block responsive to reducing the interference of the retransmission, and
      decode the third demodulated codeword.

11. The terminal according to claim 10 wherein the processor is configured to transmit the negative acknowledgment by transmitting a first negative acknowledgment corresponding to the first demodulated codeword indicating failure receiving the first data block and transmitting a second negative acknowledgment corresponding to the second demodulated codeword indicating failure receiving the second data block.

12. The terminal according to claim 10 wherein the processor is configured to decode the third demodulated codeword by decoding the third demodulated codeword responsive to the first and the third demodulated codewords.

13. The terminal according to claim 10 wherein the processor is further configured to:

transmit a positive acknowledgment through the transceiver indicating success receiving the first and second data blocks responsive to success decoding the third demodulated codeword.

14. The terminal according to claim 13 wherein the processor is configured to decode the second demodulated codeword by generating a second received data block corresponding to the second data block, wherein the processor is configured to decode the third demodulated codeword by generating a first received data block corresponding to the first data block, and wherein the processor is further configured to:

combine the first and second received data blocks into a received data stream.

15. The terminal according to claim 10 wherein the negative acknowledgement comprises a first negative acknowledgement, and wherein the processor is further configured to:

transmit a second negative acknowledgement through the transceiver indicating failure receiving the first and second data blocks responsive to failure decoding the third demodulated codeword.

16. The terminal according to claim 15 wherein the retransmission comprises a first retransmission, and wherein the processor is further configured to:

receive a second retransmission of the first and second data blocks over the respective first and second MIMO layers during a third transmission time interval after transmitting the second negative acknowledgment, reduce interference of the second retransmission responsive to the second demodulated codeword, generate a fourth demodulated codeword corresponding to the second retransmission of the first data block responsive to reducing interference of the second retransmission, and decode the fourth demodulated codeword.

17. The terminal according to claim 16 the processor is configured to decode the fourth demodulated codeword by decoding the fourth demodulated codeword responsive to the fourth demodulated codeword and responsive to at least one of the first demodulated codeword and/or the third demodulated codeword.

18. The terminal according to any one of claim 16 wherein the processor is configured to decode the second demodulated codeword by generating a second received data block corresponding to the second data block, and wherein the processor is configured to decode of the fourth demodulated codeword by generating a first received data block corresponding to the first data block, and wherein the processor is further configured to:

transmit a positive acknowledgment indicating success receiving the first and second data blocks responsive to success decoding the fourth demodulated codeword, and combine the first and second received data blocks into a received data stream.

\* \* \* \* \*